(12) United States Patent
Nguyen et al.

(10) Patent No.: US 10,753,170 B2
(45) Date of Patent: Aug. 25, 2020

(54) COMPOSITE CIRCULAR CONNECTOR SEAL AND METHOD OF USE

(71) Applicant: Oceaneering International, Inc., Houston, TX (US)

(72) Inventors: Thomas H. Nguyen, Friendswood, TX (US); Forrest Earl Shanks, II, Rosharon, TX (US); Douglas Allen Watkins, Magnolia, TX (US); William David Wightman, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 650 days.

(21) Appl. No.: 15/097,463

(22) Filed: Apr. 13, 2016

(65) Prior Publication Data

US 2016/0298416 A1 Oct. 13, 2016

Related U.S. Application Data

(60) Provisional application No. 62/146,698, filed on Apr. 13, 2015.

(51) Int. Cl.
| | |
|---|---|
| *E21B 33/12* | (2006.01) |
| *F16J 15/16* | (2006.01) |
| *E21B 33/00* | (2006.01) |

(52) U.S. Cl.
CPC ...... *E21B 33/1216* (2013.01); *E21B 33/1208* (2013.01); *F16J 15/166* (2013.01); *E21B 2200/01* (2020.05)

(58) Field of Classification Search
CPC .... E21B 33/005; E21B 33/10; E21B 33/1208; E21B 33/1212; E21B 33/1216; F16J 15/121; F16J 15/166
USPC ........................................................ 277/342
See application file for complete search history.

(56) References Cited

U.S. PATENT DOCUMENTS

| | | | | | |
|---|---|---|---|---|---|
| 3,068,942 A | * | 12/1962 | Brown | ................... | E21B 33/12 166/184 |
| 3,215,205 A | * | 11/1965 | Sizer | ................... | E21B 33/1295 166/120 |
| 3,371,716 A | * | 3/1968 | Current | ............... | E21B 33/1216 166/118 |
| 3,517,742 A | * | 6/1970 | Williams | ............ | E21B 33/1216 166/134 |
| 3,554,280 A | * | 1/1971 | Tucker | ................ | E21B 33/1208 166/134 |

(Continued)

*Primary Examiner* — Nicholas L Foster
(74) *Attorney, Agent, or Firm* — Maze IP Law, P.C.

(57) ABSTRACT

A composite circular connector seal, or an assembly comprising a plurality of such seals, may be engineered to seal across a predetermined tolerance band for such seals by using two substantially circular seal elements sized to slidingly fit about a tubular that has a positive and negative outer diameter tolerance range, where each seal element is terminated at one circumferential edge with a packer cap, and a core element disposed intermediate the two substantially circular seal elements at their respective non-packer cap terminated circumferential edges. The two substantially circular seal elements comprise an organic thermoplastic polymer and the core seal element, which typically comprises a synthetic rubber, is also typically molded to the two seal elements at their respective non-packer cap terminated circumferential edges.

12 Claims, 2 Drawing Sheets

(56) References Cited

U.S. PATENT DOCUMENTS

| | | | | |
|---|---|---|---|---|
| 3,666,010 A * | 5/1972 | Harris | ............ | E21B 33/1208 166/123 |
| 4,433,847 A * | 2/1984 | Weinberg | ............ | E21B 33/1208 277/342 |
| 4,765,404 A * | 8/1988 | Bailey | ............ | E21B 7/061 166/117.6 |
| 6,948,715 B2 * | 9/2005 | Taylor | ............ | F16J 15/164 277/331 |
| 7,360,590 B2 * | 4/2008 | Kossa | ............ | E21B 33/1208 166/119 |
| 7,708,080 B2 * | 5/2010 | Conaway | ............ | E21B 33/1216 166/387 |
| 8,201,832 B2 * | 6/2012 | Kocurek | ............ | E21B 33/03 277/603 |
| 8,800,648 B2 * | 8/2014 | Kocurek | ............ | F16J 15/106 166/179 |
| 9,109,428 B2 * | 8/2015 | Frazier | ............ | E21B 33/129 |
| 9,127,527 B2 * | 9/2015 | Frazier | ............ | E21B 33/129 |
| 9,163,477 B2 * | 10/2015 | Frazier | ............ | E21B 33/129 |
| 9,458,691 B2 * | 10/2016 | Rowe | ............ | E21B 33/1212 |
| 9,617,818 B2 * | 4/2017 | Kocurek | ............ | E21B 33/03 |
| 9,835,252 B2 * | 12/2017 | Kocurek | ............ | E21B 33/03 |
| 9,863,536 B2 * | 1/2018 | Cheng | ............ | F16J 15/102 |
| 10,001,216 B2 * | 6/2018 | Puccio | ............ | F16J 15/128 |
| 2003/0209857 A1 * | 11/2003 | Keene | ............ | E21B 33/03 277/336 |
| 2003/0209862 A1 * | 11/2003 | Keene | ............ | E21B 33/1212 277/607 |
| 2004/0017047 A1 * | 1/2004 | Taylor | ............ | F16J 15/164 277/434 |
| 2010/0194049 A1 * | 8/2010 | Kocurek | ............ | E21B 33/03 277/314 |
| 2011/0240295 A1 * | 10/2011 | Porter | ............ | E21B 33/12 166/308.1 |
| 2011/0266752 A1 * | 11/2011 | Kocurek | ............ | F16J 15/024 277/322 |
| 2012/0248703 A1 * | 10/2012 | Kocurek | ............ | E21B 33/03 277/343 |
| 2014/0124193 A1 * | 5/2014 | Rowe | ............ | E21B 33/03 166/115 |
| 2014/0203516 A1 * | 7/2014 | Kocurek | ............ | E21B 33/03 277/399 |

* cited by examiner

COMPOSITE CIRCULAR CONNECTOR SEAL AND METHOD OF USE

RELATION TO PRIOR APPLICATIONS

This application claims the benefit of, and priority through, U.S. Provisional Application 62/146,698, titled "Capping Stack Hydraulic Slip-On Connector Seal Assembly," filed Apr. 13, 2015.

BACKGROUND

Sealing performance is critical for success in certain subsea operations, including cap and contain deepwater well control. Current seals require that a specific seal be used for a series of sizes or, alternatively, to use multiple seals as opposed to a single stack.

FIGURES

Various figures are included herein which illustrate aspects of embodiments of the disclosed invention.

DESCRIPTION OF EXEMPLARY EMBODIMENTS

Generally, as described below composite circular connector seals 1 (FIG. 1) are typically engineered to seal across a predetermined tolerance band for seals such as one specified for API Spec 5CT casing, i.e. +1% to −0.5% on the outside diameter. This can help avoid the need and cost of maintaining an inventory of multiple seal packs (for example, one for the high side of the casing tolerance and another for the low side) and also the operational complexity of having to install the appropriate seal pack in the field.

Figure 1:
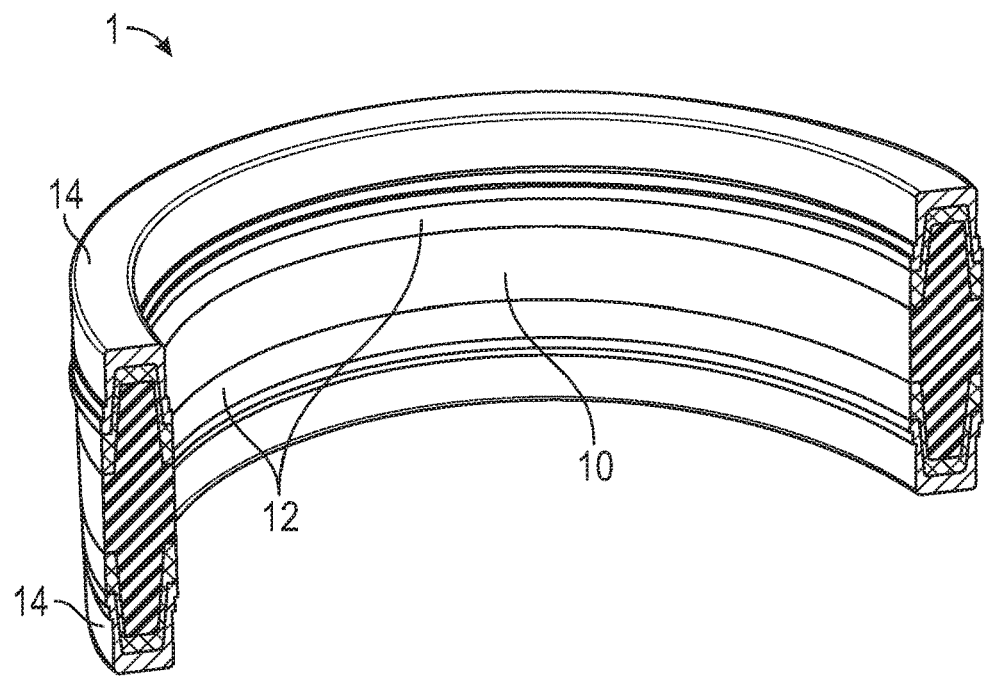
FIG. 1 is a cutaway view in partial perspective of an exemplary seal.
Figure 2:
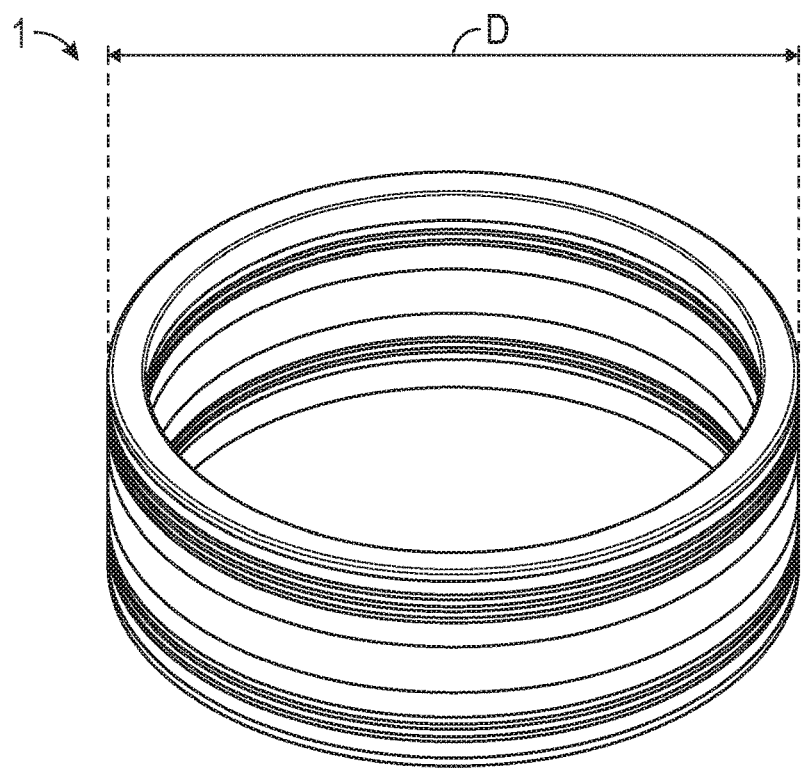
FIG. 2 is a view in partial perspective of an exemplary seal.
Figure 3:
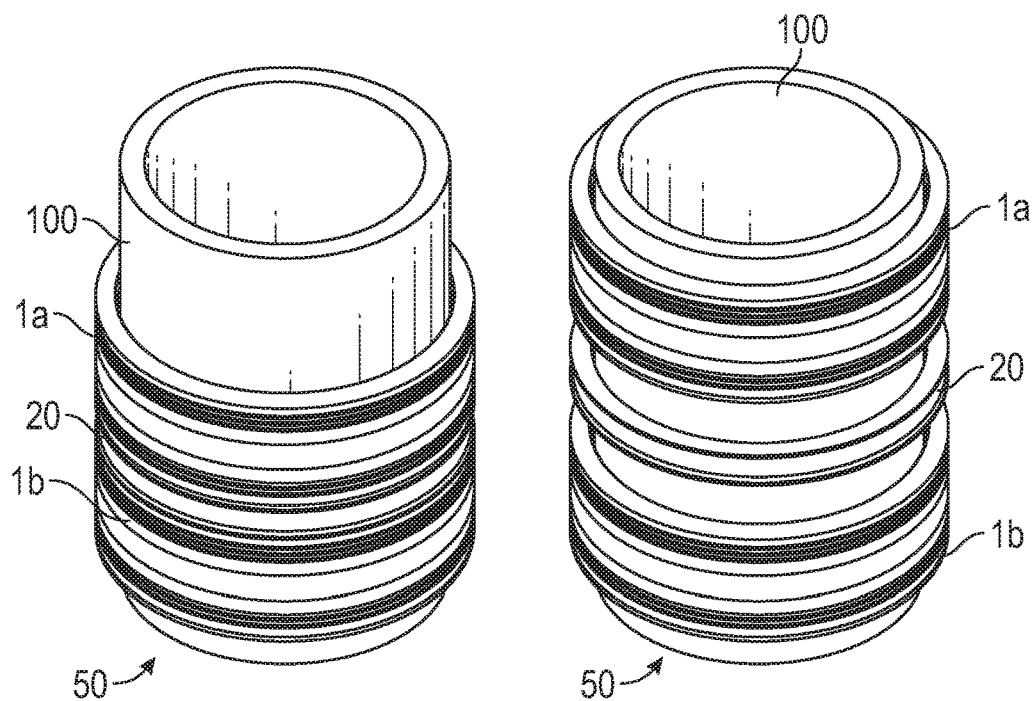
FIG. 3 are two views in partial perspective of an exemplary seal assembly.

Referring now to FIG. 1, in a first embodiment composite circular connector seal 1 defines a fully circumferential composite seal and is configured to lock and seal over tubular 100 (FIG. 3). Composite circular connector seal 1 comprises an outer diameter "D" (FIG. 2) sized to slidingly fit about tubular 100, where tubular 100 comprises a positive and negative outer diameter tolerance range. As used herein, a "tubular" may be a riser, a vertical flow casing, a conduit, or the like, most typically for subsea use.

Composite circular connector seal 1 comprises a composite stack which comprises two substantially circular seal elements 12 and a substantially circular core seal element 10 disposed intermediate to, typically molded to, the two seal elements 12. Each seal element 12 is typically configured to seal about tubular 100 to a predetermined sealing percentage and is typically used as a primary seal anti-extrusion mechanism.

In certain embodiments, each seal element 12 comprises an organic thermoplastic polymer and each is terminated at the non-molded circumferential edge with packer cap 14, which, in preferred embodiments, comprises packer caps comprising Inconel and which may further comprise a fixed diameter. The organic thermoplastic polymer may comprise a polyether ether ketone (PEEK) which, as core seal element 10 is compressed, moves into seal gap 103 (FIG. 4) to create a barrier to contain core seal element 10 material.

Figure 4:
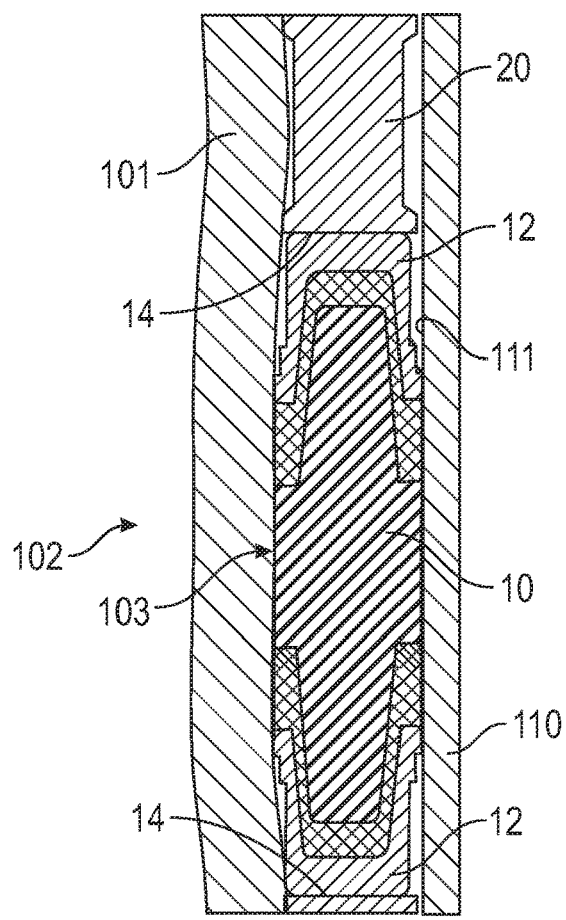
FIG. 4 is a cutaway view in partial perspective of an exemplary seal deployed in a housing.

Referring additionally to FIG. 4, core seal element 10 typically comprises a synthetic rubber, such as nitrile rubber (NBR). Typically, as the two seal elements 12 are compressed, the organic thermoplastic polymer, e.g., PEEK, moves into seal gap 103 to create a barrier to contain core seal element 10. As further illustrated in FIG. 4, core seal element 10 is typically configured such that under longitudinal compressive load of composite circular connector seal 1 (FIG. 1) core seal element 10 flows into seal gap 103 between outside 101 of tubular 100 and an inside 111 of housing 110 to create a positive seal. As used herein, a housing can be another tubular, a wellbore, or another structure, or the like. By way of example and not limitation, this positive seal may be a positive seal on an API 5CT casing across a range of minimum and maximum outer diameter tolerances for tubular 100. In certain embodiments, composite circular connector seal 1 is configured to create a positive seal load maintained on tubular 100 equal to or greater than 1.2 times the maximum allowable operating pressure (MAOP) of tubular 100. As also illustrated in FIG. 4, the volume of core seal element 10 may remain constant but its shape may alter to match the volume fill during sealing.

In its various embodiments, the flow of both the core seal element 10 material and the seal element 12 material move the inner and outer diameters of packer cap 14 to the limit of seal gap 103, creating a near metal-to-metal seal on the front and back of the core seal element 10 material and the seal element 12 material. In most embodiments, this prevents extrusive flow of either the core seal element 10 material or the seal element 12 material from either end of composite circular connector seal 12 during full compressive load and operating pressure in tubular 10.

Referring now to FIG. 3, in an embodiment slip-on connector seal assembly 50 comprises two composite circular connector seals 1, e.g. first composite circular connector seal 1a and second composite circular connector seal 1b, and metal ring 20, sometimes referred to as a Lantern Ring, disposed intermediate first composite circular connector seal 1a and second composite circular connector seal 1b. These two composite circular connector seals 1 are as described above.

In the operation of exemplary embodiments, composite circular connector seals 1 and/or slip-on connector seal assembly 50 have the capacity to seal over a substantially complete range of outer diameter tolerances for such seals. By way of example and not limitation, in certain embodiments one or more slip-on connector seal assemblies 50 and/or composite circular connector seals 1 may be used as a slip-on riser end connector for an out-of-control riser blowout preventor (BOP) situation. In those embodiments, one or more slip-on connector seal assemblies 50 and/or composite circular connector seals 1 may be attached below a BOP capping stack and lowered onto a free flowing riser in the event of an uncontrollable blowout condition. Once installed onto the free flowing riser, these one or more slip-on connector seal assemblies 50 and/or composite circular connector seals 1 may then be mechanically attached and sealed to the outer diameter of the tubular.

Referring generally to FIGS. 3 and 4, one or more slip-on connector seal assemblies 50 and/or composite circular connector seals 1 is disposed over a tubular, conduit, casing, or the like such as tubular 100 and positioned in-between outside 101 of tubular 100 and inside 111 of housing 110. Tubular 100 may have one or more deflections, shown in FIG. 4 as bulge 102, as well as positive and negative outer diameter tolerance ranges. When pressure is applied, core seal element 10 is deformed to contact outside 101 of tubular 100 and inside 111 of housing 110 at seal contact region 103.

One or more slip-on connector seal assemblies 50 and/or composite circular connector seals 1 may be locked and sealed onto tubular 100 by maneuvering the one or more slip-on connector seal assemblies 50 and/or composite circular connector seals 1, as described above, to a predetermined position on tubular 100 where composite circular connector seal 1 is installed and configured to lock and seal over tubular 100.

Once installed onto tubular 100, one or more of positioned composite circular connector seals 1 are mechanically attached, locking onto tubular 100 and being sealed onto outer diameter 101 of tubular 100.

If two composite circular connector seals 1 are used, e.g. if one or more slip-on connector seal assemblies 50 is used, the second composite circular connector seal 1b (FIG. 3) may be maneuvered to a second predetermined position on tubular 100 proximate the first composite circular connector seal 1a (FIG. 2), either separately or as part of slip-on connector seal assembly 50, and a reduced test pressure applied between two composite circular connector seals 1a, 1b to validate that a positive seal has been obtained prior to applying a full maximum allowable operating pressure to tubular 100. Typically, as described above, two composite circular connector seals 1 are separated by metal ring 20.

If synthetic rubber and PEEK materials are used, a flow of both the synthetic rubber and PEEK materials may be allowed to move the inner diameter and outer diameter of packer cap 14 to the limit of seal gap 103, thus creating a near metal-to-metal seal on the front and back of the synthetic rubber/PEEK core of composite circular connector seal 1 to prevent extrusive flow of either the synthetic rubber or PEEK materials from either end of composite circular connector seal assembly 50 during full compressive load and operating pressure in tubular 100. Additionally, for such embodiments, each seal element 12 that is molded to the synthetic rubber may be used as the primary seal anti-extrusion mechanism such that as the synthetic rubber seal is compressed, the PEEK element moves into seal gap 103 to create a barrier to contain the synthetic rubber. As will thus be apparent to one of ordinary skill in the sealing arts, under longitudinal compressive load of the connector, core seal element 10 flows into seal gap 103 to create a positive seal and, typically, its volume remains constant but its shape is altered to match the volume fill.

Additionally, composite circular connector seal 1 may be used to create a positive seal on API 5CT casing across a range of minimum and maximum outer diameter tolerances. In certain embodiments composite circular connector seal 1 is used to create a positive seal load maintained on the casing equal to or greater than 1.2 times the maximum allowable operating pressure (MAOP) of tubular 100 which, as noted before, may be a vertical free flowing casing.

In certain embodiments, core seal element 10 is allowed to flow into seal gap 103 to create a positive seal under longitudinal compressive load of composite circular connector seal 1. The volume of core seal element 10 may be maintained at a constant value and a shape of core seal element 10 may be altered to match the volume filled by core seal element 10 during sealing.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A composite circular connector seal, comprising a composite stack configured to seal on an outer surface of a tubular and be actuated by longitudinal compressive loading, the composite stack comprising:
   a. two substantially circular seal elements, each substantially circular seal element comprising a non-packer cap terminated circumferential edge, a packer cap terminated circumferential edge disposed axially opposite the non-packer cap end, and an inner channel, each substantially circular seal element terminated at the packer cap terminated circumferential edge with a packer cap dimensioned to provide an inner channel which receives the packer cap terminated circumferential edge, each substantially circular seal element comprising:
      1. an inner diameter sized to slidingly fit about the outer surface of the tubular, the tubular comprising a positive and negative outer diameter tolerance range;
      2. an organic thermoplastic polymer; and
      3. an inner surface configured to be oriented substantially parallel to the outer surface of the tubular; and
   b. a core seal element comprising an inner and an outer diameter substantially the same as the corresponding outer and inner diameters of the two substantially circular seal elements, the core seal element disposed intermediate the two substantially circular seal elements at their respective non-packer cap terminated circumferential edges within each substantially circular seal element's channel such that each substantially circular seal element envelops a different axial end of the core seal element, the core seal element comprising an inner surface configured to be oriented substantially parallel to the outer surface of the tubular, the core seal element sufficiently deformable under longitudinal compressive load to fill a seal gap between the outside surface of the tubular and an inside of a housing in which the tubular is deployed and create a positive seal which statically seals on the outer surface of the tubular.

2. The composite circular connector seal of claim 1, wherein the core seal element is molded to the two substantially circular seal elements at their respective non-packer cap terminated circumferential edges.

3. The composite circular connector seal of claim 1, wherein the packer caps comprise an Inconel® brand material.

4. The composite circular connector seal of claim 1, wherein the packer caps comprise a fixed outer diameter substantially the same as the outer diameter of the two substantially circular seal elements.

5. The composite circular connector seal of claim 1, wherein the core seal element is adapted to operate as an anti-extrusion element engaged during seal actuation by the organic thermoplastic polymer where the organic thermoplastic polymer comprising a polyether ether ketone (PEEK).

6. The composite circular connector seal of claim 5, wherein the core seal element is configured to seal about the tubular to a predetermined sealing percentage.

7. The composite circular connector seal of claim 2, wherein the core seal element comprises a synthetic rubber.

8. The composite circular connector seal of claim 7, wherein the core seal element which comprises synthetic rubber is a primary seal anti-extrusion mechanism and configured such that as the synthetic rubber core seal element is compressed, the organic thermoplastic polymer deforms to fill a seal gap and create a barrier to contain the synthetic rubber.

9. The composite circular connector seal of claim 7, wherein the composite circular connector seal is configured to create a positive seal on the outside diameter of a tubular across a range of +1% to −0.5% on an outer diameter of the tubular.

10. The composite circular connector seal of claim 9, wherein the composite circular connector seal is configured to create a positive seal contract pressure on the tubular equal to or greater than 1.2 times the maximum allowable operating pressure (MAOP) of the API 5CT compliant tubular.

11. A composite seal assembly, comprising:
 a. a first composite circular connector seal and a second composite circular connector seal, each composite circular connector seal comprising a composite stack configured to form a seal on an outer surface of a tubular and actuatable by longitudinal compressive loading, each composite stack comprising:
  i. two substantially circular seal elements, each substantially circular seal element comprising a non-packer cap terminated circumferential edge, a packer cap terminated circumferential edge disposed axially opposite the non-packer cap end, and an inner channel, each substantially circular seal element terminated at one circumferential edge with a packer cap dimensioned to provide an inner channel which receives the packer cap terminated circumferential edge, each substantially circular seal element comprising:
   1. an outer inner diameter sized to slidingly fit about an outer surface of the tubular, the tubular comprising a positive and negative outer diameter tolerance range;
   2. an organic thermoplastic polymer;
   3. an inner surface configured to be oriented substantially parallel to the outer portion of the tubular; and
   4. an outer surface configured to fit within a housing in which the tubular is deployed and to be oriented substantially parallel to an inner portion of the housing; and
  ii. a core seal element comprising an outer diameter substantially the same as the outer diameter of the two substantially circular seal elements, the core seal element disposed intermediate to the two substantially circular seal elements at their respective non-packer cap terminated circumferential edges within each substantially circular seal element's channel such that each substantially circular seal element envelops a different axial end of the core seal element, the core seal element comprising an inner surface configured to be oriented substantially parallel to the outer surface of the tubular and adapted to statically seal on the outer surface of the tubular and an outer surface configured to be oriented substantially parallel to the inner portion of the housing; and
 b. a metal ring disposed intermediate the first composite circular connector seal and the second composite circular connector seal.

12. The composite seal assembly of claim 11, further comprising a mechanical compressor, wherein:
 a. each composite circular connector seal is contained in the mechanical compressor and the mechanical compressor is operative to compress the composite circular connector seals onto the tubular; and
 b. the core seal element comprises a synthetic rubber and is configured such that under longitudinal compressive load of the mechanical compressor the core seal element deforms to fill a seal gap between the outer surface of the tubular and an inside of the housing to create a positive seal.

* * * * *